United States Patent [19]

Haug

[11] Patent Number: 5,033,952
[45] Date of Patent: Jul. 23, 1991

[54] INJECTION ADAPTER

[75] Inventor: Willi Haug, Freudenstadt, Fed. Rep. of Germany

[73] Assignee: fischerwerke Artur Fischer GmbH & Co. KG., Tumlingen/Waldachtal, Fed. Rep. of Germany

[21] Appl. No.: 478,254

[22] Filed: Feb. 9, 1990

[30] Foreign Application Priority Data

Feb. 18, 1989 [DE] Fed. Rep. of Germany ... 8901935[U]

[51] Int. Cl.⁵ .................. E21D 20/02; E02D 5/74
[52] U.S. Cl. ...................... 425/127; 52/744; 52/749; 405/260; 405/269; 425/13; 425/563
[58] Field of Search .................. 425/11–13, 425/110, 111, 127, 563, 129.1; 405/260, 269; 52/127.5, 223 L, 704, 707, 708, 744, 749, 743

[56] References Cited

U.S. PATENT DOCUMENTS

| 2,095,187 | 10/1937 | Grandbouche | 52/744 |
| 3,572,956 | 3/1971 | Liscum et al. | 52/744 |
| 4,382,720 | 5/1983 | Vonach | 425/12 |
| 4,512,123 | 4/1985 | Fischer | 52/744 |
| 4,569,808 | 2/1986 | Smali | 264/36 |
| 4,763,396 | 8/1988 | Fischer | 29/458 |
| 4,814,185 | 3/1989 | Jones | 425/12 |
| 4,905,430 | 3/1990 | Schmidt | 52/744 |

FOREIGN PATENT DOCUMENTS

| 3426088 | 1/1986 | Fed. Rep. of Germany | 52/744 |
| 3538995 | 5/1987 | Fed. Rep. of Germany | |

Primary Examiner—James C. Housel
Attorney, Agent, or Firm—Michael J. Striker

[57] ABSTRACT

An injection adapter for introducing a flowable compound into a drilled hole in masonry has a plastic tubular part having an inner thread in the upper end thereof for engaging a threaded end of a bolt of a fixing element anchored in the drilled hole which threaded end projects from the drilled hole. The injection adapter has a lower tapering end having a front annular end face for engaging an adjacent annular end face of a sleeve of the fixing element.

3 Claims, 1 Drawing Sheet

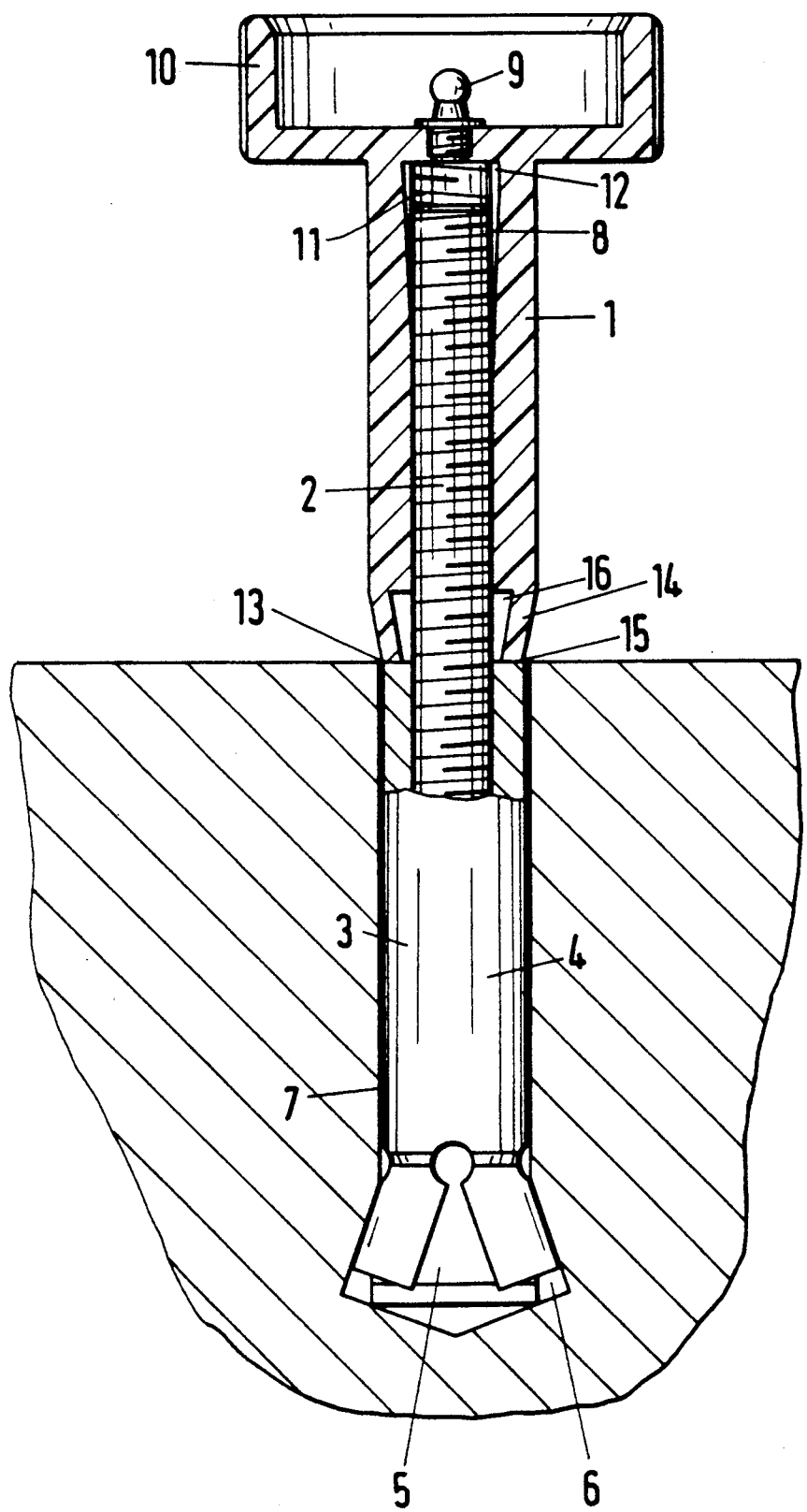

INJECTION ADAPTER

BACKGROUND OF THE INVENTION

The invention relates to an injection adapter for introducing a flowable compound into a hole drilled in masonry and in which a fixing element is anchored.

Fixing elements that are constructed as expansible metal anchors that can be inserted with a matching fit in holes drilled with an undercut are known. Extremely secure fastenings in concrete or similar substances can be produced with these fixing elements, and very high pull-out retaining forces are achieved. For special applications, it may be necessary to provide the metal fixing elements with an anti-corrosive protection, for which purpose a flowable sealing compound can be used.

DE-A-35 88 995 describes an anti-corrosive agent for a fixing element of this kind. The sealing compound in this case is first introduced into the drilled hole, then the expansible metal fixing plug is inserted into the drilled hole thus displacing the sealing compound so that this rises towards the mouth of the drilled hole. The quantity of anti-corrosive agent must be sufficient for it to be able to rise as far as the mouth of the drilled hole. Even when an adequate amount of anti-corrosive agent that rises as far as the mouth of the drilled hole is provided, with this known method it is, nevertheless, impossible to guarantee that all cavities of the fixing element will be filled with anti-corrosive agent.

SUMMARY OF THE INVENTION

The object of the invention is an injection adapter for a fixing element which guarantees that an anti-corrosive agent is introduced into and around the fixing element that has been inserted into a hole drilled in masonry. The object of the invention is achieved by providing a plastic adapter having an inner thread that engages an outer thread of a threaded bolt of the fixing element.

The injection adapter engages over the threaded bolt of the fixing element and forms a tight seal with respect to the end face of the sleeve of the fixing element. To this end, the injection adapter has a tapering end the annular front end of which lies against the end face of the sleeve. Before the anti-corrosive agent is injected, the injection adapter is screwed onto the projecting part of the threaded bolt so that this is unable to move backwards during the injecting operation. The pressure that builds up in the internal space of the injection adapter during the injecting operation, which may be above 200 bars, causes the tapering end to be pressed with a correspondingly high pressure against the adjacent end face of the sleeve of the fixing element. This ensures that even at such high pressures no anti-corrosive agent is able to escape at the transition point between injection adapter and sleeve. The anti-corrosive agent is, in this manner, forced at high pressure into all the cavities in the fixing element and the drilled hole.

Preferably, at least one longitudinal groove is arranged on the internal thread of the injection adapter; this groove acts as a flow-over channel for the anti-corrosive agent.

To obtain a high contact pressure during the injecting operation in the region of the end face of the sleeve, in the region of its tapering end, the inner space of the injection adapter is widened in an inward direction. The wall of the injection adapter is thus thinnest at its front end annular face, as a result of which a satisfactorily high degree of resiliency is achieved at this location so that this annular face is able to press against the end face of the sleeve of the fastening element in an optimum manner.

A feed nipple is preferably arranged coaxially on the injection adapter and is surrounded by a cup-shaped part. The cup-shaped part protects the nipple from being damaged and becoming contaminated when the injection adapter is laid down.

The fixing element is preferably an expansible metal fixing plug assembly, the threaded bolt of which had an expander cone which engages in the expansible sleeve.

The present invention both as to its construction so to its method of operation, together with additional objects and advantages thereof, will be best understood from the following detailed description of the preferred embodiment with reference to the appended drawing.

BRIEF DESCRIPTION OF THE DRAWINGS

The single FIGURE of the drawing shows a cross-sectional view of an injection adapter according to the invention with an expansible metal fixing plug assembly anchored in a hole drilled in masonry. cl DESCRIPTION OF THE PREFERRED EMBODIMENT The injection adapter 1 has been screwed onto the threaded bolt 2 of a fixing element 3. The fixing element 3 is an expansible metal fixing plug assembly which consists of the threaded bolt 2 and an expansible sleeve 4. At the lower end of the threaded bolt 2, there is formed an expander cone 5 which expands the sleeve 4 so that in its lower region, the expansible sleeve engages with a matching fit an undercut 6 of the drilled hole 7.

The injection adapter 1 is a plastic part with an internal thread 8, a feed nipple 9 and a cup-shaped part 10. Anti-corrosive agent can be forced via a feed nipple 9 by a pressure tool, not shown, into the inner space 11 of the adapter. The anti-corrosive agent can be pressed via a longitudinal groove 12 under high pressure along the threaded bolt 2 into the sleeve 4 until the anti-corrosive agent emerges in the region of the expander cone 5 and rises upwards along the wall of the drilled hole 7 as far as the mouth 13 of the drilled hole. It is essential in this process that the front face of the tapering end 14 of the adapter lies closely against the end face of the sleeve 4. To guarantee this, the injection adapter 1 is tapered in this region and also, in this region, has a widening inner space 16.

While the invention has been illustrated and described as embodied in an injection adapter for introducing a flowable compound into a hole drilled in masonry and in which a fixing element is anchored, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An injection adapter for introducing a flowable compound into a hole drilled in masonry and in which a fixing element comprising a bolt having a threaded end projecting above a mouth of the drilled hole, and an expansible sleeve, are anchored, said injection adapter comprising a plastic tubular part having an upper end provided with an internal thread to be screwed onto the threaded end of the bolt of the fixing element, an end wall formed at said upper end, a lower tapering end having a front annular end face for engaging an adjacent annular end face of the sleeve of the fixing element; a feed nipple received in said wall, and at least one longitudinal groove in a region of said internal thread.

2. An injection adapter according to claim 1, wherein said injection adapter has a longitudinal axis and a flange part extending transverse to the longitudinal axis and defining said wall, said feed nipple being arranged coaxially with said longitudinal axis.

3. An injection adapter according to claim 1, wherein said injection adapter has an internal space in a region of said tapering end which widens in an upward direction.

* * * * *